J. McG. LAMB.
MEANS FOR THE DETACHMENT OF WHEELS.
APPLICATION FILED JUNE 21, 1912.
1,090,865.
Patented Mar. 24, 1914.
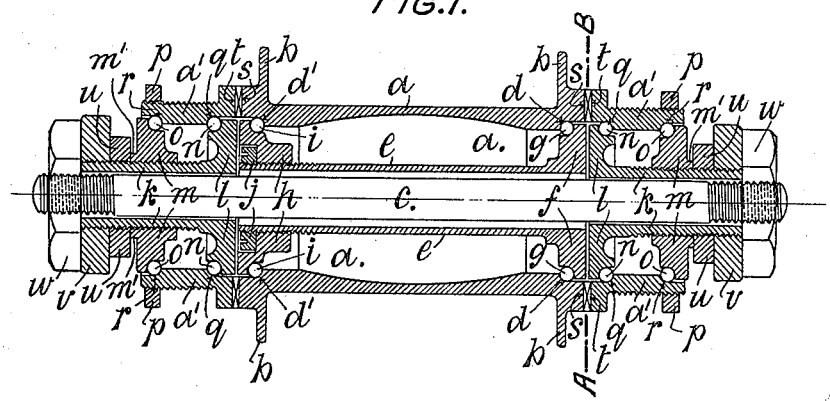
Fig. 1.
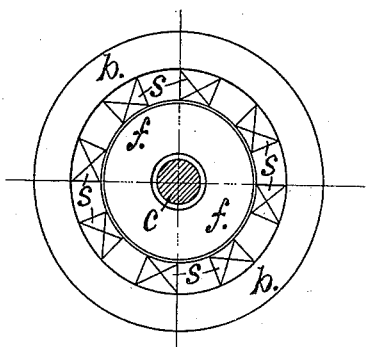
Fig. 2.
Witnesses:
Chas. W. Stauffiger
Anna M. Dorr.
Inventor
John McGhie Lamb,
By 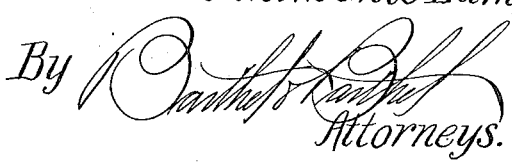
Attorneys.

UNITED STATES PATENT OFFICE.

JOHN McGHIE LAMB, OF KIRKBY, ENGLAND.

MEANS FOR THE DETACHMENT OF WHEELS.

1,090,865.  Specification of Letters Patent.  Patented Mar. 24, 1914.

Application filed June 21, 1912. Serial No. 705,061.

*To all whom it may concern:*

Be it known that I, JOHN McGHIE LAMB, a subject of the King of England, residing at Chatham House, Kirkby Park, Kirkby, in the county of Lancaster, England, have invented certain new and useful Improvements in Means for the Detachment of Wheels, of which the following is a specification.

This invention relates to a detachable wheel for cycles (more particularly motor cycles) tri-cars, and like vehicles, of that kind in which—for the purpose of enabling the wheel to be removed from between its stay or fork members without disconnecting the driving chain et cetera—the wheel hub is constructed in two parts which comprise a hub barrel proper with internal sleeve and bearings and a side extension with internal sleeve and bearings, said hub proper and said extension being so coupled or clutched together that by withdrawing the central spindle or axle and unfastening the coupling or clutch, the wheel with its hub proper, sleeve, and bearings may be removed; the extension with the sprocket wheel or the like mounted thereon being left *in situ* within the frame.

My invention is mainly characterized by a construction in which, the sleeve disposed within the hub barrel proper is provided at one end with a flange or ring-piece which constitutes one part of the bearing between said sleeve and said hub barrel, and abuts against a flange or ring-piece provided at the inner end of the sleeve disposed within the hub extension (said latter flange constituting one part of a bearing between said latter sleeve and said hub extension), both sleeves being provided at their opposite ends with adjustable parts of bearings; and the axle passes through said internal sleeves transversely between the stay or fork members of the vehicle.

My invention is further characterized by the particular arrangement and combination of parts as hereinafter described, and as shown in the drawing annexed hereto.

I will further describe my invention with the aid of the accompanying sheet of explanatory drawings in which:—

Figure 1 is a longitudinal section, taken through the hub of the rear or engine driven wheel and its stay supports of a motor cycle, constructed according to my invention. Fig. 2 is a cross section taken as on line A. B. Fig. 1.

$a$ represents the hub barrel proper of the wheel, which barrel is of somewhat relatively larger diameter than is at present usual, $b$ are the spoke flanges, and $c$ the wheel axle. Within the interior of said barrel $a$ and at each end thereof, there is formed a race cup or cone $d$, $d^1$, respectively: disposed around axle $c$, and lying within said barrel $a$, is a barrel or sleeve $e$, on one end whereof is integrally formed a ring piece or flange $f$ in which there is provided a race cup or cone as shown; a complete ball bearing is thus formed by said cup or cone $d$ of barrel $a$, the cup or cone formed in the ring piece or flange $f$ of sleeve $e$ and balls $g$. The other end of said sleeve $e$ is exteriorly screw threaded, and upon same is screwed a ring piece $h$ provided with a cup or cone as shown; a second complete ball bearing is thus formed by said cup or cone $d^1$ of barrel $a$, the cup or cone formed in the adjustable ring piece $h$, and balls $i$. It will, therefore, be seen that by screwing up said ring piece $h$ on the screw threaded end of sleeve $e$ both ball bearings will be tightened. In order to prevent said ring piece $h$ from accidentally backing off said sleeve $e$ after the required adjustment of said bearings has been effected, an annular recess or cavity is formed in the outer face of said ring piece which is adapted to receive a locking nut $j$ screwed upon said barrel or sleeve $e$.

On each side of axle $c$ there is disposed a barrel or sleeve $k$ on one end whereof is integrally formed a ring piece or flange $l$ in which there is provided a race cup or cone as shown; said barrel or sleeve $k$ is exteriorly screw threaded, and upon same is screwed a cup or cone ring $m$. Around said ring pieces $l$, $m$, there is disposed a short outer barrel or cylinder $a^1$ adapted to receive and carry a driving belt pulley, band brake, chain sprocket wheel, or the like, which is maintained in position by the usual locking ring $p$. Two race cups or cones $q$, $r$, respectively are formed in the annular interior of said barrel $a^1$ which is provided with two complete sets of bearings, one formed by the cup or cone provided in the ring piece or flange $l$ of barrel or sleeve $k$, the cup or cone of barrel $a^1$, and balls $n$; and the other formed by the adjustable cup or cone ring $m$ screwed on to barrel or sleeve $k$, the cup or cone $r$ formed in barrel $a^1$, and balls $o$. The annular edge or end face $s$ of said barrel $a$ is formed as a (dog) clutch element, as is also the inner annular edge or end face $t$ of barrel $a^1$; thus when the dogs or teeth of face $s$ of said barrel $a$ are in engagement with the dogs or teeth $t$ of barrel $a^1$, both barrels will revolve as one, barrel $a^1$ virtually forming an extension of the hub barrel $a$.

The ring piece or flange $f$ (or $h$) of barrel or sleeve $e$ and the ring or flange $l$ of barrel or sleeve $k$, are arranged to butt against each other in order to stiffen or make rigid the extension and so the pulley or the like carried thereby, and, as shown in the drawing, the barrels $a$, $a^1$ are divisible in line with the butting faces of said ring pieces or flanges. It is through the abutting action of the faces of the elements $l$ and $f$ that "whipping" is prevented, consequently the hub shell and its extension are rigid for the movement of a pulley.

$u$, $u$ represent the back stays of the cycle, which support said barrels $a^1$, $a^1$, and bear against shoulders $m^1$ formed on said adjustable race cones or cups $m$; $v$, $v$, are lock nuts screwed upon the respective barrels or sleeves $k$, and $w$, $w$, are lock nuts screwed upon the respective ends of axle $c$. If it be desired to remove the wheel from between the stays $u$, $u$, it is only necessary to unscrew one or the other of said nuts $w$ from an end of axle $c$, and withdraw the axle, when the wheel (including hub or barrel $a$, sleeve $e$, and the two sets of ball bearings within said barrel $a$) may be removed from the machine, as the natural spring of stays $u$ will cause the hubs or barrels $a$, $a^1$, to separate or unlock; thus the driving belt pulley, band brake, chain sprocket wheel, or the like, carried on barrels $a^1$ are not in any way disturbed or interfered with by the removal and replacement of the wheel.

Obviously, if desired, the wheel when removed from between the back stays may be fitted between the members of the front fork of the cycle.

While preferable, it is not essential that each side of hub $a$ shall be fitted or provided with an extension $a^1$ and parts relating thereto; said hub may be provided with an extension, for effecting the end in view, at one side only.

Having now described my invention, what I claim as new and desire to secure by Letters Patent is:—

1. A wheel for vehicles, comprising a hub barrel proper; a sleeve disposed within said barrel, flanges or ring pieces one of which is adjustable, provided on both ends of said sleeve, which flanges or ring pieces constitute parts of bearings between said sleeve and said hub barrel; a side extension of said hub barrel; a sleeve disposed within said hub extension, which sleeve extends outwardly beyond said hub extension in order to provide a bearing for a stay or fork member; a flange or ring piece provided at the inner end of said hub extension sleeve, which flange or ring piece abuts against one of the flanges or ring pieces of said hub sleeve and also constitutes a part of a bearing between said hub extension sleeve and said hub extension; an adjustable ring piece provided on said hub extension sleeve, which ring piece constitutes a part of a bearing between said hub extension sleeve and said hub extension; means for coupling or clutching said hub and hub extension together and an axle passing through said sleeves transversely between the stay or fork members of the vehicle.

2. A wheel for vehicles, comprising a hub barrel proper; a sleeve disposed within said barrel, flanges or ring pieces, one of which is adjustable provided on both ends of said sleeve, which flanges or ring pieces constitute parts of bearings between said sleeve and said hub barrel; an extension arranged on each side of said hub barrel; a sleeve disposed within each hub extension, which sleeve extends outwardly beyond said hub extension in order to provide a bearing for a stay or fork member; a flange or ring piece provided at the inner end of each hub extension sleeve, which flange or ring piece abuts against one of the flanges or ring pieces of said hub sleeve and also constitutes a part of a bearing between said hub extension sleeve and said hub extension; an adjustable ring piece provided on each hub extension sleeve, which ring piece constitutes a part of a bearing between said hub extension sleeve and said hub extension; means for coupling or clutching said hub and hub extensions together; and an axle passing through said sleeves transversely between the stay or fork members of the vehicle.

3. A wheel for vehicles, comprising a hub barrel proper; race cups or cones formed in the interior of said hub barrel, a sleeve disposed within said hub barrel; flanges or ring pieces, one of which is adjustable provided on both ends of said sleeve; race cups or cones formed in said flanges or ring pieces adapted to pair with those of the hub barrel, and balls or rollers arranged between the respective pairs of said race cups or cones; a side extension of said hub barrel; race cups or cones formed in the interior of said side extension; a sleeve disposed within said hub extension, which sleeve extends outwardly beyond said hub extension in order to provide a bearing for a stay or fork member; flanges or ring pieces one of which is adjustable, and one of which abuts against a flange or ring piece of said hub sleeve, provided on said hub extension sleeve; race cups or cones formed in said flanges or ring pieces of said hub extension sleeve, adapted to pair with those of said hub extension, and balls or rollers arranged between the respective pairs of said race cups or cones; means for coupling or clutching said hub and hub extension together, and an axle passing through said sleeve transversely between the stay or fork members of the vehicle.

4. A wheel for vehicles comprising a hub barrel proper; race cups or cones formed in the interior of said hub barrel; a sleeve disposed within said hub barrel; flanges or ring pieces, one of which is adjustable, provided on both ends of said sleeve; race cups or cones formed in said flanges or ring pieces adapted to pair with those of the hub barrel, and balls or rollers arranged between the respective pairs of said race cups or cones; an extension arranged at each side of said hub barrel; race cups or cones formed in the interior of each side extension; a sleeve disposed within each hub extension, which sleeve extends outwardly beyond said hub extension in order to provide a bearing for a stay or fork member; flanges or ring pieces, one of which is adjustable and one of which abuts against a flange or ring piece of said hub sleeve, provided on each hub extension sleeve; race cups or cones formed in said flanges or ring pieces of each hub extension sleeve adapted to pair with those of a hub extension, and balls or rollers arranged between the respective pairs of said race cups or cones; means for coupling or clutching said hub and hub extensions together; and an axle passing through said sleeves transversely between the stay or fork members of the vehicle.

5. A wheel for vehicles, comprising a hub barrel proper; a sleeve disposed within said barrel; flanges or ring pieces, one of which is adjustable, provided on both ends of said sleeve which flanges or ring pieces constitute parts of bearings between said sleeve and said hub barrel; a side extension of said hub barrel; a sleeve disposed within said hub extension, which sleeve extends outwardly beyond said hub extension in order to provide a bearing for a stay or fork member; a flange or ring piece provided at the inner end of said hub extension sleeve, which flange or ring piece abuts against one of the flanges or ring pieces of said hub sleeve and also constitutes a part of a bearing between said hub extension sleeve and said hub extension; an adjustable ring piece provided on said extension sleeve, which ring piece constitutes a part of a bearing between said hub extension sleeve and said hub extension; a clutch element formed or provided on a side of said hub barrel, and a second clutch element formed or provided on the adjacent side of said hub extension; and an axle passing through said sleeves transversely between the stay or fork members of the vehicle.

6. A wheel for vehicles, comprising a hub barrel proper; a sleeve disposed within said barrel; flanges or ring pieces, one of which is adjustable, provided on both ends of said sleeve, which flanges or ring pieces constitute parts of bearings between said sleeve and said hub barrel; an extension arranged on each side of said hub barrel; a sleeve disposed within each hub extension which sleeve extends outwardly beyond said hub extension in order to provide a bearing for a stay or fork member; a flange or ring piece provided at the inner end of each hub extension sleeve which flange or ring piece abuts against one of the flanges or ring pieces of said hub sleeve and also constitutes a part of a bearing between said hub extension sleeve and said hub extension; an adjustable ring piece provided on each hub extension sleeve, which ring piece constitutes a part of a bearing between said hub extension sleeve and said hub extension; a clutch element formed or provided on each side of said hub-barrel, and clutch elements formed or provided on the adjacent sides of said hub extensions; and an axle passing through said sleeve transversely between the stay or fork members of the vehicle.

7. A wheel for vehicles, comprising a hub barrel proper; race cups or cones formed in the interior of said hub barrel; a sleeve disposed within said hub barrel; flanges or ring pieces, one of which is adjustable, provided on both ends of said sleeve, race cups or cones formed in said flanges or ring pieces adapted to pair with those of the hub barrel, and balls or rollers arranged between the respective pairs of race cups or cones; a side extension of said hub barrel; race cups or cones formed in the interior of said side extension; a sleeve disposed within said hub extension, which sleeve extends outwardly beyond said hub extension in order to provide a bearing for a stay or fork member; flanges or ring pieces, one of which is adjustable and one of which abuts against a flange or ring piece of said hub sleeve, provided on said hub extension sleeve; race cups or cones formed in said flanges or ring pieces of said hub extension sleeve, adapted to pair with those of said hub extension, and balls or rollers arranged between the respective pairs of said race cups or cones; a clutch element formed or provided on a side of said hub barrel, and a second clutch element formed or provided on the adjacent side of said hub extension; and an axle passing through said sleeves transversely between the stay or fork members of the vehicle.

8. A wheel for vehicles, comprising a hub barrel proper; race cups or cones formed in the interior of said hub barrel; a sleeve disposed within said hub barrel; flanges or ring pieces, one of which is adjustable, provided on both ends of said sleeve, race cups or cones formed in said flanges or ring pieces adapted to pair with those of the hub barrel, and balls or rollers arranged between the respective pairs of said race cups or cones; an extension arranged at each side of said hub barrel; race cups or cones formed in the interior of each side extension, a sleeve disposed within said hub extension which sleeve extends outwardly beyond said hub extension in order to provide a bearing for a stay or fork member; flanges or ring pieces, one of which is adjustable, and one of which abuts against a flange or ring piece of said hub sleeve, provided on each hub extension sleeve, race cups or cones formed in said flanges or ring pieces of each hub extension sleeve adapted to pair with those of a hub extension, and balls or rollers arranged between the respective pairs of said race cups or cones; a clutch element formed or provided on each side of said barrel, and clutch elements formed or provided on the adjacent sides of said hub extensions; and an axle passing through said sleeves transversely between the stay or fork members of the vehicle.

In testimony whereof I affix my signature in presence of two witnesses.

JOHN McGHIE LAMB.

Witnesses:
JOHN H. WALKER,
H. WILLIAMS.

---

Copies of this patent may be obtained for five cents each, by addressing the "Commissioner of Patents, Washington, D. C."